United States Patent
Foss et al.

(10) Patent No.: US 10,111,445 B1
(45) Date of Patent: Oct. 30, 2018

(54) PROCEDURE FOR PREPARING PREMIUM COCKTAIL BERRIES

(71) Applicant: Lounge Attire, LLC, Shell Beach, CA (US)

(72) Inventors: Natalie Denise Foss, Shell Beach, CA (US); Jan Wiley Matsuno, Piedmont, CA (US)

(73) Assignee: Lounge Attire LLC, Shell Beach, CA (US)

( * ) Notice: Subject to any disclaimer, the term of this patent is extended or adjusted under 35 U.S.C. 154(b) by 356 days.

(21) Appl. No.: 14/198,367

(22) Filed: Mar. 5, 2014

Related U.S. Application Data

(60) Provisional application No. 61/775,013, filed on Mar. 8, 2013, provisional application No. 61/808,130, filed on Apr. 3, 2013.

(51) Int. Cl.
    *A23B 7/08* (2006.01)

(52) U.S. Cl.
    CPC .................... *A23B 7/085* (2013.01)

(58) Field of Classification Search
    None
    See application file for complete search history.

(56) References Cited

U.S. PATENT DOCUMENTS

| | | | |
|---|---|---|---|
| 2,019,030 A | 10/1935 | Tucker | |
| 2,320,036 A | 5/1943 | Harris | |
| 5,397,588 A | 3/1995 | Antenucci et al. | |
| 6,645,544 B2 | 11/2003 | Chenchin et al. | |
| 7,153,536 B2 | 12/2006 | Kuhns et al. | |
| 7,575,772 B2 | 8/2009 | Shi et al. | |
| 8,178,146 B2 | 5/2012 | Sinha et al. | |
| 2004/0009267 A1 | 1/2004 | Muggride et al. | |
| 2007/0224327 A1 | 9/2007 | Otte et al. | |
| 2010/0068356 A1 | 3/2010 | Saelzer | |

OTHER PUBLICATIONS

OSU. Preserving Cranberries. Mar. 2008. pp. 1-2.*
USDA. Home Canning Guide 2 Selecting, Preparing, and Canning Fruits and Fruit Products. 2009. pp. 1-32.*

(Continued)

*Primary Examiner* — D. Lawrence Tarazano
*Assistant Examiner* — Stephanie A Cox
(74) *Attorney, Agent, or Firm* — Gay Cumberbatch; Mark A. Goldstein; SoCal IP Law Group LLP

(57) ABSTRACT

The present invention relates to whole fruit preparation methods and, more particularly, to methods of cocktail berry production including preserving the berries in jars, especially useful for cranberries. The process results in a product that is very near to the natural state of the fruit. The starting quality is carefully selected to have a high natural sugar content, and processed gently with no heating. The cranberries are stored in a syrup that has approximately the same sugar content, or Brix, so as to create an "isotonic" equilibrium across the skin of the berry. The syrup also has a relatively low natural sugar proportion, with high intensity sweeteners added so as not to degrade the integrity of the berries. A preservative or acid is added to the syrup, and the berries and syrup are added to the jars to minimize head space and ensure the syrup surrounds all the berries.

22 Claims, 2 Drawing Sheets

(56) References Cited

OTHER PUBLICATIONS

SB Canning. Sugar Substitutes. Aug. 26, 2011. pp. 1-6.*
WSU. Evaluation of Brix, Acidity, and Tacy in PNW cranberries as a function of harvest time. 2004. pp. 1-10.*
FAO. Chemical Preservation. 1995. pp. 1-7.*
Colorado State University. Freezing Fruits. Food and Nutrition No. 9.331. Jul. 10, 2001. pp. 1-6.*
U.S. Environmental Protection Agency (EPA), 9.8.1 Canned Fruit and Vegetables, Aug. 1995, total of 8 pages.
Urban Farm Online, How to Pickle Vegetables and Fruits, http://www.urbanfarmonline.com/urban-gardening/backyard-gardening/how-to-pickle-vegetables-and-fruit.aspx, Accessed Mar. 5, 2014, total of 2 pages.
phickle.com, We Can Pickle That! Pickled Cranberries!, http://phickle.com/index.php/we-can-phickle-that-pickled-cranberries/, Oct. 13, 2013, Accessed Mar. 5, 2014, total of 6 pages.

* cited by examiner

PROCEDURE FOR PREPARING PREMIUM COCKTAIL BERRIES

RELATED APPLICATION INFORMATION

The present application claims priority under 35 U.S.C. § 119 to U.S. Provisional Patent Application No. 61/775,013, filed Mar. 8, 2013, and to U.S. Provisional Patent Application No. 61/808,130, filed Apr. 3, 2013.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

FIELD OF THE INVENTION

The present application relates to whole fruit preparation methods and, more particularly, to methods of cocktail berry production including preserving the berries in jars, especially useful for cranberries.

BACKGROUND OF THE INVENTION

The canning of fruits and vegetables is a growing, competitive industry, especially in the U.S. for export. The industry is made up of establishments primarily engaged in canning fruits, vegetables, fruit and vegetable juices; processing ketchup and other tomato sauces; and producing natural and imitation preserves, jams, and jellies. Typical canned products include beans (cut and whole), beets, carrots, corn, peas, spinach, tomatoes, apples, peaches, pineapple, pears, apricots, and cranberries. Typical juices are orange, pineapple, grapefruit, tomato, and cranberry. The term canning includes preserving in actual cans as well as bottles and jars, among other containers.

One key objective of food processing is the preservation of perishable foods in a stable form that can be stored and shipped to distant markets during all months of the year. Processing also can change foods into new or more usable forms and make foods more convenient to prepare. Consequently, one goal of the canning process is to destroy any microorganisms in the food and prevent recontamination by microorganisms. Heat is the most common agent used to destroy microorganisms. Removal of oxygen can be used in conjunction with other methods to prevent the growth of oxygen requiring microorganisms.

A typical commercial canning operation may employ the following general processes: washing, sorting/grading, preparation, container filling, exhausting, container sealing, heat sterilization, cooling, labeling/casing, and storage for shipment. One of the major differences in the sequence of operations between fruit and vegetable canning is the blanching operation. Most of the fruits are not blanched prior to can filling whereas many of the vegetables undergo this step. With many fruits, preliminary treatment steps (e.g., peeling, coring, halving, pitting) occur prior to any heating or cooking step. Unfortunately, the often intensive processing, especially heating, tends to change the character of the produce to other than its natural state. While this may be desirable in some cases, such as in pickling cucumbers, the result with canned fruits can be extremely disappointing.

Preserved fruit, more commonly referred to in United States markets as canned fruit, usually comprise between 10 and 25% by weight of sugar, but higher concentrations up to above 30% by weight can occasionally be reached. The sugar in the syrup for canned fruit serves primarily for sweetening, but also to improve the aroma and fruitiness. The conventional measure of the sugar content of a solution or fruit is Brix, with units in degrees (° Bx). One degree Brix is 1 gram of sucrose in 100 grams of solution/fruit and represents the sugar strength as percentage by weight (% w/w).

Despite the long history of advances in canning methods, there remains a need for an improved method for preparing fresh whole fruits, especially berries, that preserves the fruit in large part in its natural state.

SUMMARY OF THE INVENTION

The present application provides processes for preparing and preserving whole fruit, in particular berries and more particularly cranberries. The process results in a product that is very near to the natural state of the fruit. When processing cranberries, the starting quality is carefully selected to have a high natural sugar content, and processed gently with no heating. The cranberries are stored in a syrup that has approximately the same sugar content, or Brix, so as to create an "isotonic" equilibrium across the skin of the berry. That is, the sugar concentration within and around the berries is approximately equal, ensuring that the berries do not absorb more sugar nor lose natural sugar to the syrup. Furthermore, the syrup has a relatively low natural sugar proportion, with high intensity sweeteners added. In this way, excess sugar does not unduly degrade the integrity of the berries, such as by causing shriveling over time.

One process of preparing and preserving whole fruit, comprises the steps of:
  selecting a quantity of whole fruit;
  ensuring the temperature of the whole fruit at no time during the process exceeds 70° F.;
  measuring the Brix of the whole fruit in ° Bx;
  preparing a syrup with no more than 10% sugar;
  adjusting the syrup to within ±1° Bx of the whole fruit;
  transferring the syrup to a jar filling tank and agitating tank;
  filling jars with the whole fruit;
  shaking the jars to settle the whole fruit and filling with the whole fruit to a top lip of each jar;
  adding the syrup to the jars to fill to within about ⅛ inch headspace; and
  capping, rinsing and labelling the jars.

The process may further comprise freezing the whole fruit, and slow thawing the whole fruit prior to measuring the Brix. The step of preparing a syrup preferably comprises adding a high intensity sweetener such as *Stevia* extract and adding a preservative. The preservative is desirably a mixture of sodium benzoate and potassium sorbate.

An alternative to a preservative may be to increase the acid content, such as by adding citric acid. The idea is to maintain the pH of the syrup below a level at which yeast will grow, such as below 2.2. However, the natural sweetness and taste of the berry should not be compromised. Furthermore, high intensity sweetener (stevia or sucralose) may be added to "offset" or "balance" the intense sourness created by adding acid to reduce the pH to 2.2.

In one embodiment the whole fruit comprises berries, preferably cranberries. In one embodiment, the process includes selecting only late harvest cranberries having a Brix of between 8.5-10° Bx, more preferably between 8.7-9.3° Bx. Additionally, the selected cranberries preferably have a pH of between 2-3, and the step of preparing the syrup includes adjusting the pH of the syrup to between 3.5-4.5.

A process of preparing and preserving whole berries, comprising:
  selecting a quantity of whole berries;
  freezing the berries;
  slow thawing the berries;
  ensuring the temperature of the berries at no time during the process exceeds 70° F.;
  measuring the Brix of the berries in ° Bx;
  preparing a syrup with a high intensity sweetener and no more than 10% sugar, the syrup including a preservative;
  adjusting the syrup to within ±1° Bx of the berries;
  transferring the syrup to a jar filling tank and agitating tank;
  filling jars with the berries;
  shaking the jars to settle the berries and filling with the berries to a top lip of each jar;
  adding the syrup to the jars to fill to within about ⅛ inch headspace; and
  capping, rinsing and labelling the jars.

The high intensity sweetener is preferably Stevia extract, and the preservative may be a mixture of sodium benzoate and potassium sorbate. The berries are desirably cranberries, and preferably late harvest cranberries having a Brix of between 8.5-10° Bx, more preferably between 8.7-9.3° Bx. The step of preparing the syrup may include adjusting the Brix of the syrup to between 8.5-9.5° Bx, more preferably between 8.8-9.2° Bx. In a preferred embodiment, the selected cranberries have a pH of between 2-3, and the step of preparing the syrup includes adjusting the pH of the syrup to between 3.5-4.5. The syrup desirably includes, in order of percent weight from most to least, water, sugar, lemon juice concentrate, Stevia, and the preservative.

DESCRIPTION OF THE PREFERRED EMBODIMENTS

Figure 1:
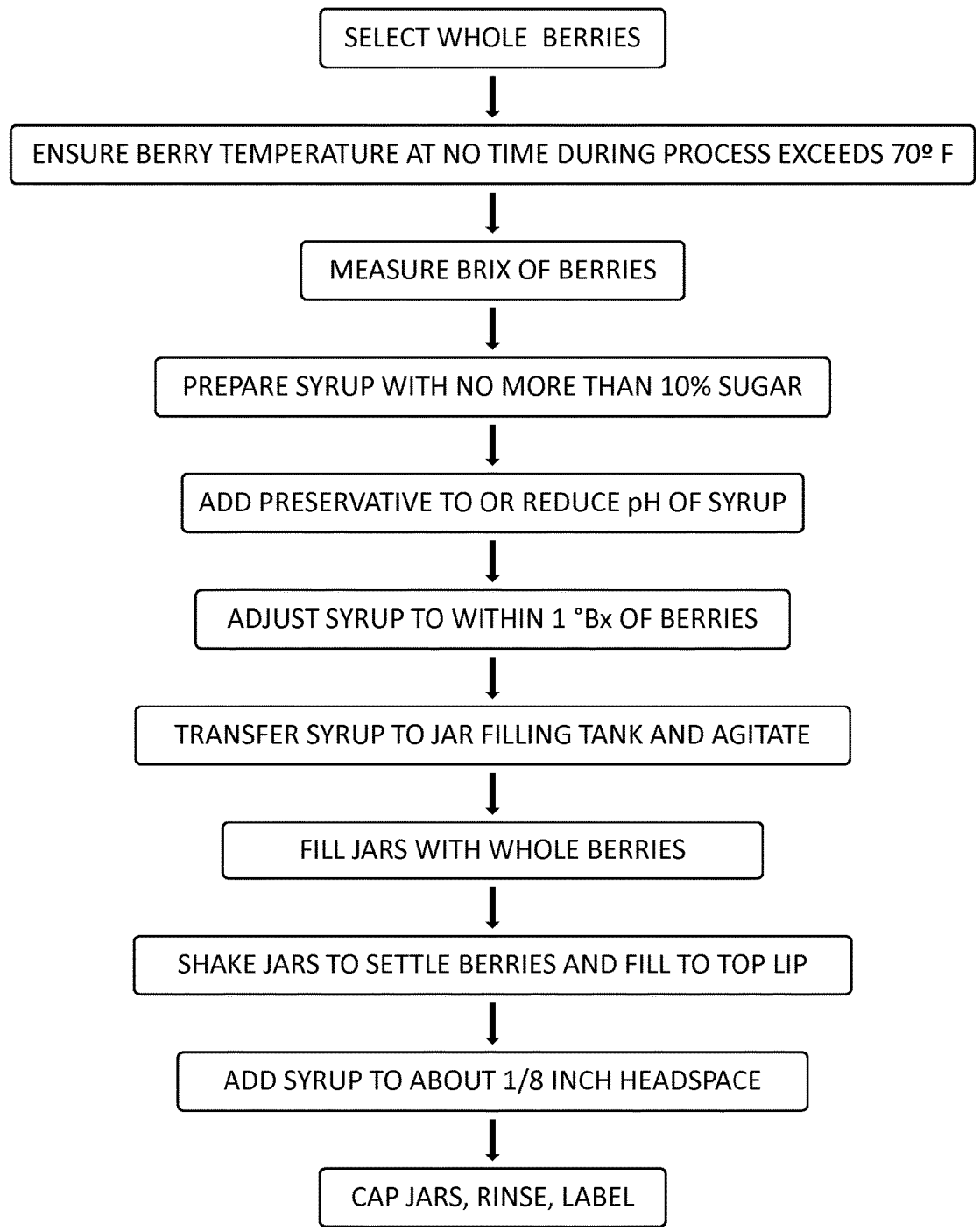
FIG. 1 is a flowchart of an exemplary process for preserving whole berries.
Figure 2:
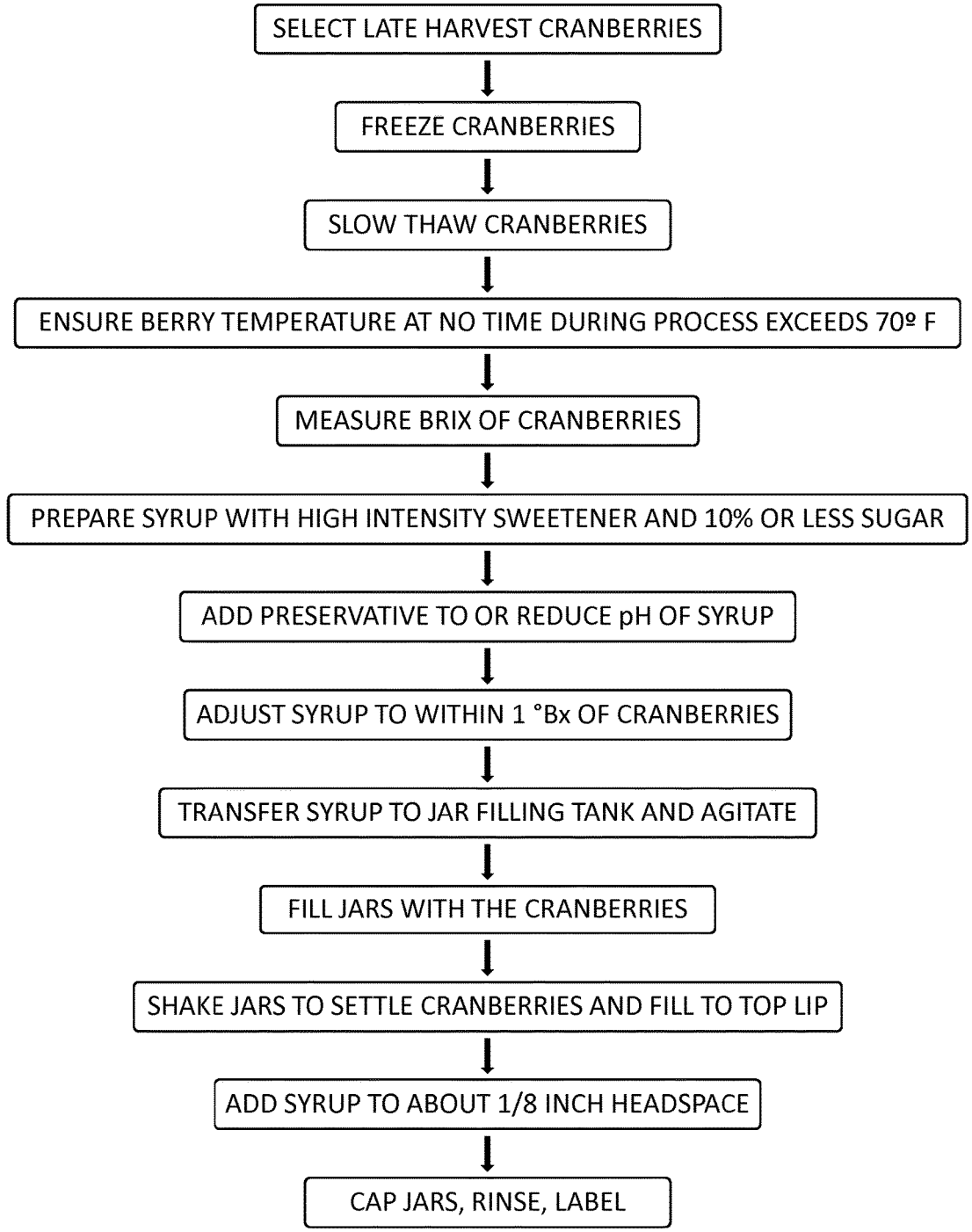
FIG. 2 is a flowchart of a preferred process for preserving whole cranberries.

FIG. 1 is a flowchart of an exemplary process for preserving whole fruit, and FIG. 2 is a flowchart of a preferred process for preserving whole berries. Although the detailed process steps provided below pertain to cranberries, they can be easily modified for other whole berries, such as blueberries, gooseberries, cherries, even grapes. Other whole fruits which may be processed in the same manner include cherry or grape tomatoes, apricots, plums, loquats, and the like. In general, the sturdier the fruit the better it will withstand the processing and storage without breaking down, which is why cranberries are so well suited. Some properties of cranberries which make them good candidates for this type of processing, include:
  They do not get soft after freezing
  They do not soften when held under refrigeration
  Firm outer skin (maintains color, texture and shape)
  Natural sourness and low pH (inhibits spoilage, compatible with low pH syrup)
  Natural benzoate content (inhibits spoilage)
  Stable color Consequently, other fruits sharing some or all of these properties are more suited to the processes disclosed herein.

Procedure for Preparing Premium Cocktail Cranberries

The following procedure describes how to make and prepare cranberries that may be used to accentuate the appearance and flavor of various mixed drinks and cocktails. The process includes selecting the cranberries, formulation of a syrup, and parameters to result in a cranberry having a natural appearance and quality. At no time in the process are the berries heated, and in particular the berries are not to exceed 70° F.

Procedure

1. The procedure includes slow refrigerated thawing of cranberries followed by gentle handling. Start with frozen cranberries. Thaw cranberries under refrigeration or for short periods at ambient. Do not allow berries to exceed 70° F. at any time. Do not store berries above 40 F for more than 4 hours. Do not hold refrigerated more than 3 days.

2. Prepare syrup by first thoroughly dissolving sodium benzoate and potassium sorbate with water. Dry blend Stevia extract with sugar and calcium chloride, then add this dry mixture to syrup and mix until sugar dissolves. Add lemon juice concentrate last and mix well. Note that the brix of the syrup can never exceed the brix of the cranberries. In some versions, cranberry juice concentrate is used in place of lemon juice concentrate. This does two things: 1) reduce the pH (due to acidity of the cranberry concentrate), same as with lemon, but also 2) the color from the cranberry concentrate colors the berries resulting in a more even, consistent berry color.

3. Transfer syrup to fill tank. Maintain agitation in fill tank to avoid pulp settling to the bottom. Syrup temperature must never exceed 70 F.

4. Fill thawed berries into jars. Berries should be shaken down into jars so they are filled to the top with no headspace. Do not PRESS berries into jars. Overfilling the jars with berries may be used to decrease headspace.

5. The berries are stored in the jars with an isotonic packing medium. This is achieved by adding the syrup described above to the jar to completely cover berries (there should be about ⅛ inch headspace). Overfilling the jars with syrup may be used to completely cover the berries. The natural flavor of the cranberries is enhanced with the high intensity sweetener, namely the syrup.

6. Cap jars, rinse thoroughly with water, pressurized air dry, apply labels and in-line code.

The actions taken above may be advantageously performed in a cool or refrigerated environment. Cold packing of the jars with the cranberries and syrup may be used, though if it is too cold and the berries are not fully thawed, they cannot be filled effectively into jars. Room temperature packing may alternatively be used.

The jars are typically glass and may be plastic, lined/coated metal or other suitable material.

Although the above process starts with frozen cranberries, fresh cranberries may be used.

Key Points:

Start with cranberries that naturally have a high sugar content (ie: "late harvest from a region with a long growing season")

Apply no heat, ever. Keep the cranberries cold. There is no blanching, no heating of syrup, no heating of finished jars.

Slow refrigeration thawing of berries followed by gentle handling.

Rather than heating to pasteurize, a preservative is desirably added to extend shelf life and prevent spoilage. Diluted sodium benzoate and potassium sorbate are typically used, though other preservatives are contemplated. Alternatively, the acid content maybe increased, such as by adding citric acid, to maintain the pH of the syrup below a level at which yeast will grow, such as below 2.2. However, the natural sweetness and taste of the berry should not be compromised. Furthermore, high intensity sweetener (stevia or sucralose) may be added to "offset" or "balance" the intense sourness created by adding acid to reduce the pH to 2.2.

Isotonic packing medium; Isotonic solutions have equal osmotic pressure. In cell biology there is an isotonic environment when an equal concentration exists inside and outside the cell. In the present context, there is an isotonic relationship between the sweetness inside and outside the skin of the berry.

Flavor enhanced with high intensity sweetener (in this case, Stevia extract)

Fill the jars to 1/8". Cranberries must be kept submerged when packed.

Overfilling jars with both berries and syrup (cranberries float, so must be submerged in syrup to stay plump)

Cold pack (unless berries not fully thawed)

It should be noted that pickling of fruits and vegetables is known. However, most pickling processes involve immersion of the fruit or vegetable in a salty brine solution, which would not be palatable for a sweet cocktail berry. Some pickling is done without salt and involves a sour/vinegar brine. However, no pickling process is completely cold. Fruits in particular are heated at least a little bit to kill yeast/mold/bacteria and inactivate natural enzymes in the fruit that can cause browning or softening over time, thus resulting in a shelf stable product.

It is important to understand that that no salt is added in the processes described herein, and these are not pickling processes.

Table I below shows one example of ingredients to be included in the cranberry product disclosed herein.

TABLE I

| Fill (per jar): | | |
| --- | --- | --- |
| Ingredient | % | Grams/jar |
| Cranberries, see spec sheet, thawed | 50.6 | 120 |
| Syrup | 49.4 | 117 |
| Total | 100 | 237 |

| Syrup: | | |
| --- | --- | --- |
| Ingredient | % | lb/60 gal |
| water | 90.80 | 469.6 |
| sugar, dry granulated | 8.50 | 44.0 |
| Lemon juice concentrate 400 gpl | 0.31 | 1.6 |
| Stevia 25% solution (Reb A-99%) | 0.09 | 0.47 |
| Sodium Benzoate, USP | 0.10 | 0.5 |
| Potassium Sorbate, USP | 0.10 | 0.5 |
| Calcium Chloride, USP | 0.10 | 0.5 |
| total | 100.00 | 517.2 |

TABLE I-continued

| Quality Assurance Checks: | | |
| --- | --- | --- |
| Test | Specification | Frequency |
| Ingoing cranberries - pH | 2.2-2.7 | Every 2 hours |
| Brix | 8.7-9.3 | Once per day |
| Ingoing Syrup - pH | 3.8-4.2 | Every batch |
| Brix | 8.8-9.2 | Every batch |
| Fill weight of berries | 120-125 grams | On line |
| Finished weight with syrup | 225-237 grams | On line |
| Comminuted product - pH | 2.2-2.7 | Once per syrup batch |
| Brix | 8.8-9.2 | Once per syrup batch |

The procedure described in the prior pages to prepare cranberries for use with mixed drinks and cocktails starts with frozen whole cranberries. The following is a description of the frozen whole cranberries used in the procedure.

Product Description:

Frozen premium vine-ripened, late harvest, cranberries (preferably sourced from Oregon) that are washed, dried, sized, color sorted, hand inspected, and packed into 20 pound boxes, lined with high-density clear poly bags to maintain their high quality. From vine to freezer in less than 48 hours. The preferred freezer parameters are that the cranberries are stored at about −10° F. and shipped at 0° F.+/−15° F. The shelf life of the cranberries is approximately 3 years at −10° F.

Table II below indicates preferred characteristics/properties of the cranberries for use in the methods described herein:

TABLE II

| SPECIFICATIONS | TOLERANCE |
| --- | --- |
| Color | Bright, uniform deep red color, typical of late harvest Oregon cranberries with no white/green/yellow/pink. Chemical color analysis will exceed 60 mg/100 g fruit. |
| Flavor | Free from objectionable flavors and odors of any kind. Minimum Brix 8.7; target range 9-10. |
| Size | 99.5% between 5/8" and 3/4" in size. |
| Defects | Exceeds USDA Grade A. Hand sorted/inspected for any extraneous material so practically free of harmless extraneous plant and insect material. Unusable fruit not to exceed 0.5%. |
| Freezer Shrink | Less than 2.0% Based on fresh fruit weight, frozen berries may lose moisture upon storage. |

The selection of the cranberries is a very important initial step. Cranberries are selected on a conveyor belt. Any mature fruit carrying a green color should be excluded. Fresh and ripe fruits are picked, while decayed, molded or insect damaged fruits are removed and discarded. Underripe Cranberries are discarded also because they tend to taste bitter. The purpose of the selection process is to ensure a good quality of the product.

Cleaning Procedure

Cranberries are cleaned in a moving water bath equipped with air agitator. The water bath has two compartments: the first compartment is for initial wash, whereas the second compartment is for further washing. The fruits are moved through the two compartments by the force of moving water propelled by air agitation from below. The fruits are thoroughly washed to remove all adhering dirt. The washing water should not contain disinfectant solutions, detergents or chlorine.

The type of sugar used in the process may vary. Sugar (sucrose) is a carbohydrate that consists of two simple sugars, fructose and sucrose. Sucrose, or disaccharide, derives from sugar cane/beet root, whereas fructose, a monosaccharide, is found in fruit, vegetable and honey. High fructose corn syrup is very popular at present because of the premium profile of sweetness that fructose offers. However, high fructose corn syrup contains an almost equal combination of fructose and glucose that might contribute to the growing epidemic of obesity.

The type of high intensity sweetener may also be varied from Stevia extract. Stevia is a natural sweetener that comes from a plant in the daisy family called Stevia rebaudiana. Alternative sweeteners include Acesulfame potassium, which is made from acetoacetic acid and potassium, and blends well with other sweeteners. SUCRALOSE is marketed by the brand name of SPLENDA, and it is a chlorocarbon chemical that contains three atoms of chlorine in every molecule. Another sweetener such as ASPARTAME is made from amino acids and phenylalanine.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

It is claimed:

1. A cold process of preparing and preserving whole cranberries to result in preserved cranberries having an appearance that is close to natural cranberries, comprising:
   selecting a quantity of whole cranberries;
   ensuring the temperature of the whole cranberries at no time during the process exceeds 70° F.;
   at no time freezing the whole cranberries;
   measuring the Brix of the whole cranberries in ° Bx;
   preparing a syrup with no more than 10% sugar;
   adjusting the syrup to within ±1° Bx of the whole cranberries;
   adding a preservative to the syrup or reducing the pH;
   agitating the syrup in a tank;
   filling jars with the whole cranberries and syrup;
   capping, rinsing and labelling the jars, and
   wherein during the entire process neither the syrup nor the cranberries are heated which ensures that the preserved cranberries have an appearance that is close to natural cranberries.

2. The process of claim 1, wherein the syrup includes, in order of percent weight from most to least, water, sugar, lemon juice concentrate, Stevia, and the preservative.

3. The process of claim 1, wherein the step of preparing a syrup further comprises:
   adding a high intensity sweetener.

4. The process of claim 3, wherein the high intensity sweetener is Stevia extract.

5. The process of claim 1, wherein the preservative is a mixture of sodium benzoate and potassium sorbate.

6. The process of claim 1, wherein the step of selecting comprises selecting only late harvest cranberries having a Brix of between 8.5-10° Bx.

7. The process of claim 6, wherein the selected cranberries have a Brix of between 8.7-9.3° Bx.

8. The process of claim 6, wherein the selected cranberries have a pH of between 2-3, and the step of preparing the syrup includes adjusting the pH of the syrup to between 3.5-4.5.

9. The process of claim 6, wherein the step of preparing the syrup includes adjusting the Brix of the syrup to between 8.5-9.5° Bx.

10. The process of claim 1, further including no heating of the filled jars.

11. The process of claim 1, the step of filling comprises:
    filling the jars with the whole cranberries;
    shaking the jars to settle the whole cranberries and further filling with the whole cranberries to a top lip of each jar; and
    adding the syrup to the jars to fill to within about ⅛ inch headspace.

12. A cold process of preparing and preserving whole cranberries to result in preserved cranberries having an appearance that is close to natural cranberries, comprising:
    selecting a quantity of whole cranberries;
    freezing the cranberries;
    slow thawing the cranberries;
    ensuring the temperature of the cranberries at no time during the process exceeds 70° F.;
    measuring the Brix of the frozen then thawed cranberries in ° Bx;
    preparing a syrup with a high intensity sweetener and no more than 10% sugar;
    adding a preservative to the syrup or reducing the pH;
    adjusting the syrup to within ±1° Bx of the cranberries;
    agitating the syrup in a tank;
    filling jars with the cranberries and syrup;
    capping, rinsing and labelling the jars, and
    wherein during the entire process neither the syrup nor the cranberries are heated which ensures that the preserved cranberries have an appearance that is close to natural cranberries.

13. The process of claim 12, wherein the high intensity sweetener is Stevia extract.

14. The process of claim 12, wherein the preservative is a mixture of sodium benzoate and potassium sorbate.

15. The process of claim 12, wherein the step of selecting comprises selecting only late harvest cranberries having a Brix of between 8.5-10° Bx.

16. The process of claim 15, wherein the selected cranberries have a Brix of between 8.7-9.3° Bx.

17. The process of claim 16, wherein the step of preparing the syrup includes adjusting the Brix of the syrup to between 8.8-9.2° Bx.

18. The process of claim 15, wherein the step of preparing the syrup includes adjusting the Brix of the syrup to between 8.5-9.5° Bx.

19. The process of claim 15, wherein the selected cranberries have a pH of between 2-3, and the step of preparing the syrup includes adjusting the pH of the syrup to between 3.5-4.5.

20. The process of claim 12, wherein the syrup includes, in order of percent weight from most to least, water, sugar, lemon juice concentrate, Stevia, and the preservative.

21. The process of claim 12, further including no heating of the filled jars.

22. The process of claim 12, the step of filling comprises:
    filling the jars with the cranberries;
    shaking the jars to settle the cranberries and further filling with the berries to a top lip of each jar; and
    adding the syrup to the jars to fill to within about ⅛ inch headspace.

* * * * *